United States Patent [19]

Shirato

[11] Patent Number: 5,285,595
[45] Date of Patent: Feb. 15, 1994

[54] HYDROPONIC GROWING SYSTEM

[75] Inventor: Kozo Shirato, Ohmiya, Japan

[73] Assignee: Erma Incorporation, Japan

[21] Appl. No.: 647,933

[22] Filed: Jan. 30, 1991

[51] Int. Cl.$^5$ .............................................. A01G 31/00
[52] U.S. Cl. ..................................................... 47/62
[58] Field of Search ............................. 47/60, 17, 62

[56] References Cited

U.S. PATENT DOCUMENTS

| | | | |
|---|---|---|---|
| 3,577,678 | 5/1971 | Barton | 47/17 EC |
| 3,925,926 | 12/1975 | Shigeo | 47/62 |
| 4,149,970 | 4/1979 | Francis | 47/62 |
| 4,543,744 | 10/1985 | Royster | 47/60 |
| 4,805,343 | 2/1989 | Patterson | 47/79 |
| 5,042,196 | 8/1991 | Lukawski | 47/62 |
| 5,044,117 | 9/1991 | Kückens | 47/62 |

Primary Examiner—Henry E. Raduazo
Attorney, Agent, or Firm—Watson, Cole, Grindle & Watson

[57] ABSTRACT

The present invention controls the concentrations of oxygen and carbonate gases in a hydroponic solution in a growing pool, by independently connecting online to a growing pool a hydroponic-solution feeder in the structure such that a plurality of semipermeable-membrane tubes to circulate liquid fertilizer (or water) is placed and arranged in a tank to circulate water (or liquid fertilizer), and a controller of dissolved gas concentration in the structure such that a hydroponic-solution conduit and a gas conduit are formed separately by arranging in the tank a separating membrane to pass only gas and prevent the permeation of liquid, and circulating oxygen and/or carbonate gas in the gas conduit of the controller of dissolved gas concentration, along with the circulation of the hydroponic solution in the growing pool through the hydroponic-solution conduit while appropriately controlling the concentration of liquid fertilizer in the hydroponic solution by means of the hydroponic-solution feeder, whereby the dissolved gas in the hydroponic solution is substituted with oxygen and/or carbonate gas.

5 Claims, 2 Drawing Sheets

HYDROPONIC GROWING SYSTEM

BACKGROUND OF THE INVENTION

The present invention relates to a hydroponic growing system.

Bubbling systems have been employed in conventional hydroponic growing systems so as to feed oxygen into the hydroponic solution in the growing pools thereof, which is extremely inefficient and is disadvantageous with respect to the maintenance and control of, e.g., the concentration of liquid fertilizer, in the hydroponic solution.

There are additional disadvantages such that it is impossible to suppress or promote the growth in horticulture on an as needed basis, and that water and liquid fertilizer in large quantities are required in order to prevent the decomposition of hydroponic solution and the development of rotten roots.

OBJECT AND SUMMARY OF THE INVENTION

The present invention has been carried out on taking account of the conventional disadvantages hereinabove described. The present invention is directed to providing a hydroponic growing system whereby the quality control of the hydroponic solution, including the control of the concentration of liquid fertilizer therein, can be easily and appropriately carried out to circumvent the decomposition of the hydroponic solution and the development of rotten roots and the growth in horticulture can be easily suppressed or promoted if needed and which does not require water or liquid fertilizer in large quantities.

The hydroponic growing system which can achieve such object, in accordance with the present invention, is characterized by the structure thereof such that to a growing pool is connected online a hydroponic-solution feeder with a structure such that a plurality of semi-permeable-membrane tubes to circulate liquid fertilizer (or water) is placed and positioned in a tank to circulate water (or liquid fertilizer). When water (or liquid fertilizer) is circulated in the tank of the hydroponic-solution feeder, simultaneously with the circulation of liquid fertilizer (or water) into the semipermeable-membrane tubes, liquid fertilizer and water infiltrate and diffuse through the semipermeable-membrane tubes into each other, according to the principle of dialysis, to be mixed and prepared into a hydroponic solution of a desirable concentration. Subsequently, the hydroponic solution is fed online to the growing pool.

The hydroponic growing system of the present invention is also characterized by the structure thereof such that the dissolved gas in the hydroponic solution in a hydroponic-solution conduit is substituted with the oxygen and/or carbon dioxide gas in a gas conduit, by connecting online to the growing pool a controller of dissolved gas concentration in the structure such that a hydroponic-solution conduit and a gas conduit are formed separately by arranging in the tank a separating membrane to pass only gas and prevent the permeation of liquid, and circulating oxygen and/or carbon dioxide gas in the gas conduit of the controller of dissolved gas concentration, along with the circulation of the hydroponic solution in the growing pool through the hydroponic-solution conduit; by circulating, in the hydroponic-solution conduit of the controller of dissolved gas concentration, the hydroponic solution in the growing pool and circulating also oxygen and/or carbon dioxide gas in the gas conduit, the dissolved gas in the hydroponic solution in the hydroponic-solution conduit and the oxygen and/or carbon dioxide gas in the gas conduit infiltrate and permeate, through the separating membrane, into each other, due to the difference in the gaseous partial pressures, whereby the dissolved gas is substituted with the oxygen and/or carbon dioxide gas, so that the oxygen and carbon dioxide gas concentrations in the hydroponic solution in the growing pool are put under control.

DETAILED DESCRIPTION OF THE PREFERRED EMBODIMENT

Figure 1:
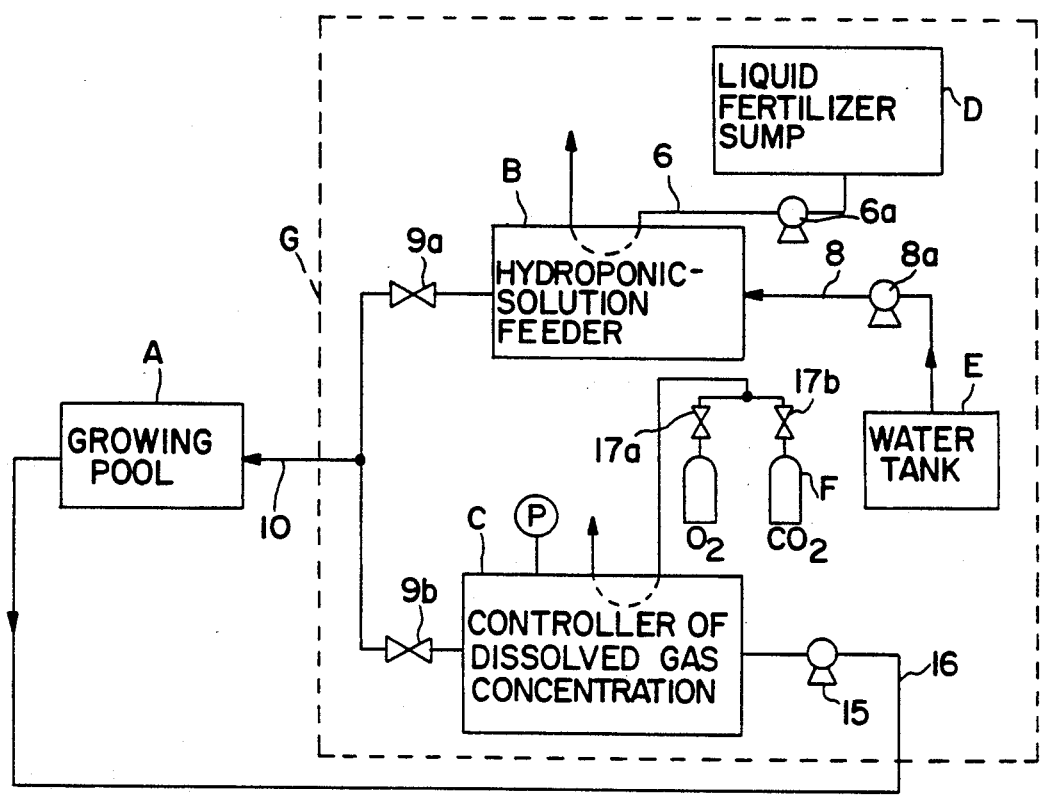
FIG. 1 is a schematic diagram of a system as an example according to the present invention.

As shown in FIG. 1, the hydroponic growing system of the present invention includes a growing pool A, a hydroponic-solution feeder B which feeds a hydroponic solution containing a desirable concentration of liquid fertilizer to the growing pool A, and a controller of dissolved gas concentration C for controlling the oxygen and carbon dioxide gas concentrations, both of these gases being dissolved in the hydroponic solution in the growing pool A. A liquid-fertilizer sump D pooling liquid fertilizer and a water tank E pooling water are individually communicated with and connected to the hydroponic-solution feeder B, whereas gas bombs F separately pooling oxygen and carbon dioxide gases are communicated with and connected to the controller of dissolved gas concentration C.

Figure 2:
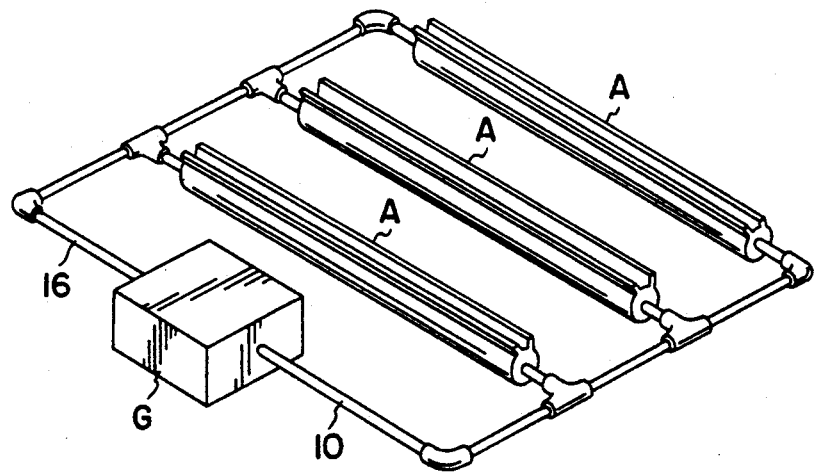
FIG. 2 is a figure depicting the appearance of a hydroponic growing system to be arranged according to the present invention.

The hydroponic-solution feeder B, the controller of dissolved gas concentration C, the liquid-fertilizer sump D, the water tank E and the gas bombs F are placed and arranged in a single box or chamber G, as shown in FIG. 2, while the growing pool A is depicted outside the chamber. However, the growing pool A can be inside the chamber G depending on the need.

Figure 3:
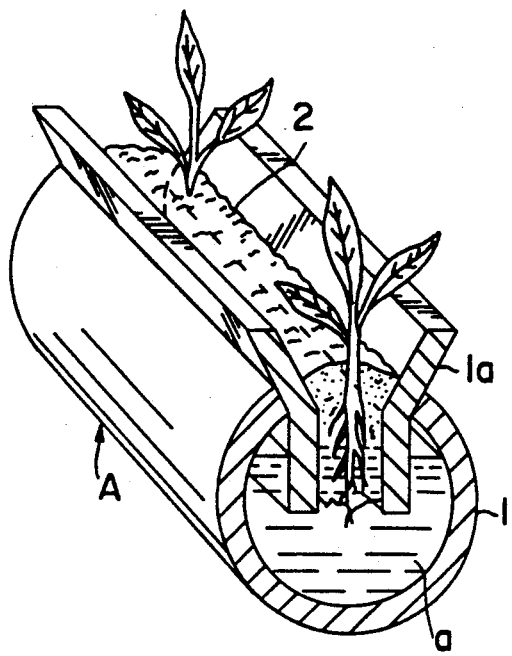
FIG. 3 is a sectional perspective view of an example of a growing pool according to the present invention.

As has been carried out conventionally, the growing pool A may be in the structure of a form of large-scale water pool, in which a hydroponic solution is pooled with permanent planting-support boards. As is shown in FIG. 3, the growing pool A is preferably in a structure such that a pool body 1 is formed in a pipe-like form with its single upper side being open, to arrange a growing bed 2 inside the upper open part 1a of the pool body 1. By constructing the growing pool A as is shown in FIG. 3, a smaller amount of hydroponic solution to be pooled or circulated in the bed body 1 may be needed, which also contributes to the facile circulation of hydroponic solution along with the prevention of unnecessary vaporization of hydroponic solution.

Figure 4:
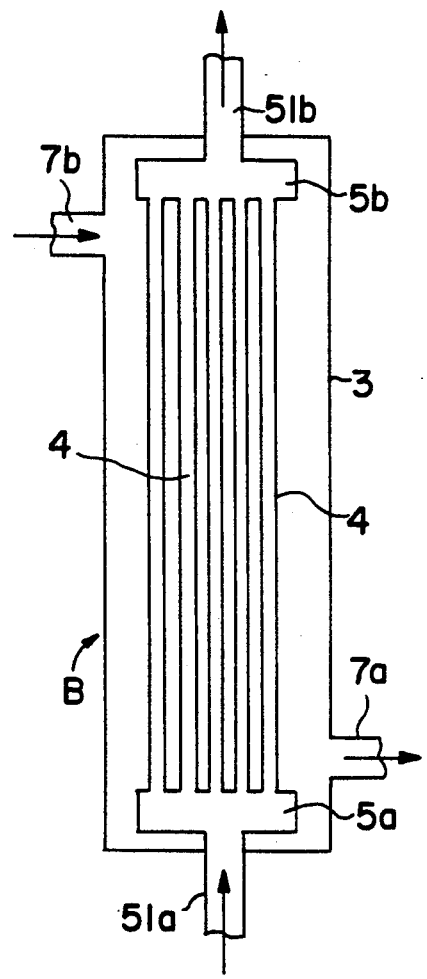
FIG. 4 is a schematic diagram of an example of the hydroponic-solution feeder according to the present invention.

As shown in FIG. 4, the hydroponic-solution feeder B includes a tank 3 so as to circulate water (or liquid fertilizer) and semipermeable-membrane tubes 4 to circulate liquid fertilizer (or water). The semipermeable-membrane tubes 4 each comprise a material with a dialyzable function, for example, polyvinyl alcohol fiber film or tetrafluoroethylene thin film, and are formed into a form of slender and hollow tubes. A plurality of the semipermeable-membrane tubes 4 are used with one-end opening being communicated with and connected to an inflow end connection (inflow header) 5a, along with the other-end opening being communicated with and connected to an outflow end connection (outflow header) 5b. Then, the semipermeable-membrane tubes 4 in a bundle are placed and positioned in a tank 3, and both of the end connection 51a and end connection 51b of the inflow end connection 5a and outflow end connection 5b, respectively, are made to protrude from the both sides of the tank 3. Through a liquid-fertilizer conduit 6 containing a pump 6a, a liquid-fertilizer sump D is communicated with and connected to the end connection 51a for inflow (inflow header), whereas a waste-water pool (not shown in figures) is communicated with and connected to the end connection 51b for outflow. In the tank 3, a discharge-opening 7a is formed near the inflow end connection 5a of the semipermeable-membrane tubes 4, and a supply port 7b is formed near the outflow end connection (overflow header) 5b. A water tank E is communicated with and connected to the supply port 7b through a water supply pipe 8 containing a pump 8a, while a feed pipe 10 in connection with the growing pool A is connected online, through a shut-down valve 9a, to the discharge opening 7a. The embodiment depicted in the figures is constructed such that water is circulated in the tank 3 while liquid fertilizer is circulated in the semipermeable-membrane tubes 4. In an alternative embodiment, liquid fertilizer may be circulated in the tank 3 while water is circulated in the semipermeable-membrane tubes 4. In this case, the water tank E and the growing pool A are communicated with and connected to the side of the inflow end connection 5a of the semipermeable-membrane tubes 4 and the side of the outflow end connection 5b thereof, respectively, while the liquid-fertilizer sump D is communicated with and connected to the supply port 7b of the tank 3.

When water (or liquid fertilizer) is circulated in the tank 3 concurrently with the circulation of liquid fertilizer (or water) in each of the semipermeable-membrane tubes 4, liquid fertilizer and water infiltrate and diffuse into each other, through the semipermeable-membrane tubes 4 each functioning as semipermeable membrane according to the principle of dialysis, to be mixed and prepared into a hydroponic solution of a desirable concentration near the discharge port 7a of the tank 3 (or near the outflow end connection 5b of the semipermeable-membrane tubes 4). Then, the hydroponic solution is fed online through the feed pipe 10 to the inside of the growing pool A. The concentration of liquid fertilizer is regulated with the flows of the liquid fertilizer and water being circulated in the tank 3 and each of the semipermeable-membrane tubes 4 as provided by pumps 6a and 8a.

Figure 5:
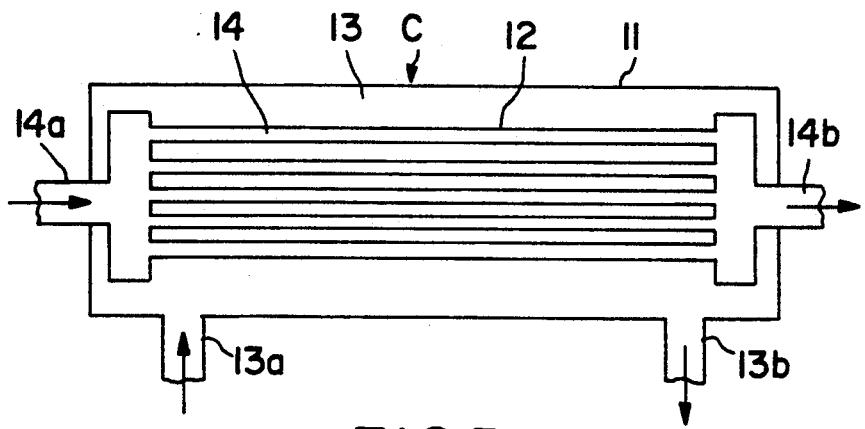
FIG. 5 is a schematic diagram of an example of the controller of dissolved gas concentration according to the present invention.

As seen in FIG. 5, the controller of dissolved gas concentration C is constructed, by separating a gas conduit 13 and a hydroponic-solution conduit 14 with a separating membrane 12 to pass only gas and prevent the permeation of liquid. That is, the separating membrane 12 for separating a gas conduit 13 and a hydroponic-solution conduit 14, is formed into a hollow pipe or flat film by using a material capable of passing only gas and preventing the permeation of liquid, for example a synthetic resin such as fluorine resin, silicone resin, and carbon resin, or an inorganic material such as metallic film material, wherein the property of the material does not matter at all whether the material is porous or non-porous, or crystalline or amorphous. The formed membrane 12 separately forms the gas conduit 13 and the hydroponic-solution conduit 14, cooperatively with the tank 11 as is shown in FIG. 5. In the embodiment represented in the figure, a separating membrane 12 is formed into a plurality of slender and hollow pipes, while a gas inflow opening 13a and a gas outflow opening 13b are formed inside a tank 11 to turn the space between the tank 11 and the separating membrane 12 into a gas conduit 13 and to turn the inside of the tube-like separating membrane 12 into a hydroponic-solution conduit 14, of which the inflow opening 14a and the outflow opening 14b are made to protrude from the both sides of the tank 11. The gas bombs F for oxygen and carbon dioxide gases are then communicated with and connected to the gas inflow opening 13a of the gas conduit 13, whereas a tank of exhausted gas (not shown in figures) is connected to the gas outflow opening 13b. A pipe 16 connected through a liquid-transporting pump 15 to the growing pool A, is communicated with and connected to the inflow opening 14a of the hydroponic-solution conduit 14, while a feed pipe 10 connected through a shut-down valve 9b to the growing pool A is connected online to an outflow opening 14b, to circulate through the hydroponic-solution conduit 14 the hydroponic solution in the growing pool A. In case that oxygen and/or carbon dioxide gas is to be fed into and circulated in the gas conduit 13, a mixture of oxygen and carbon dioxide gases, after their respective preparation to desirable concentrations, may be fed and circulated, or the gas bombs F of oxygen and carbon dioxide gases may be switched individually by means of selector valves 17a and 17b, so as to feed oxygen and carbon dioxide gases separately. As in the embodiment shown in figures, the concentrations of the two are more easily controlled by independently controlling the concentrations of oxygen and carbon dioxide gases in the hydroponic solution a in the growing pool A.

By circulating the hydroponic-solution a in the growing pool A in the hydroponic-solution conduit 14 of the controller of dissolved gas concentration C and circulating oxygen and/or carbon dioxide gas in the gas conduit 13, the hydroponic solution a and oxygen and/or carbon dioxide gas contact to each other through the separating membrane 12, the dissolved gas in the hydroponic solution a and the oxygen and/or carbon dioxide gas in the gas conduit 13 infiltrate and permeate into each other through the separating membrane 12, due to the difference in the gaseous partial pressures, whereby the dissolved gas in the hydroponic solution a is substituted with the oxygen and/or carbon dioxide gas, so that the oxygen and carbon dioxide gas concentrations in the hydroponic solution a in the growing pool A are put under control.

According to the hydroponic growing system of the present invention, as has been heretofore mentioned, a hydroponic solution of a desirable liquid-fertilizer concentration can be fed online to a growing pool by means of a hydroponic-solution feeder, and the concentration of liquid fertilizer in the hydroponic solution can be easily and appropriately controlled.

According to the hydroponic growing system of the present invention, the concentrations of the dissolved oxygen and carbon dioxide gases can be easily and appropriately controlled, so the growth in horticulture can be promoted or suppressed through the increase in the concentration of oxygen or carbonate gas, which realizes easy control of horticulture planning.

Thus, in accordance with the hydroponic growing system of the present invention, hydroponic solution can be routinely maintained and controlled at its best condition without causing the decomposition of hydroponic solution or the development of rotten roots; on the other hand, in order to prevent the decomposition of hydroponic solution and the development of rotten roots, water or liquid fertilizer in large quantities are never required. Consequently, a hydroponic horticulture can be easily achieved at an area with less water being obtained.

What is claimed is:

1. A hydroponic growing apparatus which comprises:
   a hydroponic culture body in which plants can grow and through which a hydroponic solution can flow,
   supply means for supplying a hydroponic solution containing liquid fertilizer and controlled amounts of dissolved oxygen and carbon dioxide to said hydroponic culture body via a feed pipe, said supply means comprising
     a hydroponic solution feeder connected to said feed pipe for providing water having liquid fertilizer therein, said feeder including a first housing having first and second liquid passages extending therethrough, one of said passages being defined by a liquid-to-liquid semipermeable membrane means,
     a liquid fertilizer sump connected to said first housing to provide liquid fertilizer to one of said first and second liquid passages,
     a first pump means for controlling the flow of liquid fertilizer from said liquid fertilizer sump to said first housing,
     a water tank connected to said hydroponic solution feeder to provide water to another of said first and second liquid passages,
     a second pump means for controlling the flow of water from said water tank to said first housing,
     a controller of dissolved gases connected to said feed pipe, said controller including a second housing having first and second fluid medium flow passages therethrough, one of said passages being defined by a gas-to-liquid semipermeable membrane means,
     an oxygen bomb connected to said second housing to provide oxygen to one of said first and second fluid medium flow passages,
     a first valve means for controlling the flow of oxygen from said oxygen bomb to said second housing,
     a carbon dioxide bomb connected to said second housing to provide carbon dioxide to said one of said first and second fluid medium flow passages,
     a second valve means for controlling the flow of carbon dioxide from said carbon dioxide bomb to said second housing, and
     a recirculating pipe connected between said hydroponic culture body and said second housing to recirculate hydroponic solution to another of said first and second fluid medium passages, said first and second pumps and said first and second valves enabling the control of the liquid fertilizer concentration and the oxygen and carbon dioxide gas concentrations in the hydroponic solution.

2. A hydroponic growing apparatus as defined in claim 1, wherein said liquid-to-liquid semipermeable membrane means in said first housing comprises a plurality of tubes that extend between an inflow header and an outflow header.

3. A hydroponic growing apparatus as defined in claim 1, wherein said gas-to-liquid semipermeable membrane means in said second housing comprises a plurality of tubes that extend between an inflow header and an outflow header.

4. A hydroponic growing apparatus as defined in claim 1, wherein said feed pipe is T-shaped and contains shut-off valves to control the flow of water with liquid fertilizer and the flow of recirculated hydroponic solution containing dissolved oxygen and carbon dioxide to said hydroponic culture body.

5. A hydroponic growing apparatus as define in claim 1, wherein said hydroponic culture body comprises a plurality of tubes having openings along upper surfaces thereof to support planting beds.

* * * * *

UNITED STATES PATENT AND TRADEMARK OFFICE
CERTIFICATE OF CORRECTION

PATENT NO. : 5,285,595
DATED : February 15, 1994
INVENTOR(S) : Kozo Shirato

It is certified that error appears in the above-indentified patent and that said Letters Patent is hereby corrected as shown below:

On the title page, Iatem [73] should read :
-- Erma CR. Incorporated, Kawaguchi, Japan This certificate supercedes Certificate of Correction issued August 15, 1995.

Signed and Sealed this

Sixteenth Day of April, 1996

Attest:

BRUCE LEHMAN

Attesting Officer

Commissioner of Patents and Trademarks